May 25, 1954  J. E. ERIKSSON  2,679,083
APPARATUS FOR MOLDING CEMENT STAIRSTEPS
Filed July 10, 1951  3 Sheets-Sheet 1

INVENTOR
JOHN E. ERIKSSON
BY Sommers & Young
ATTORNEYS

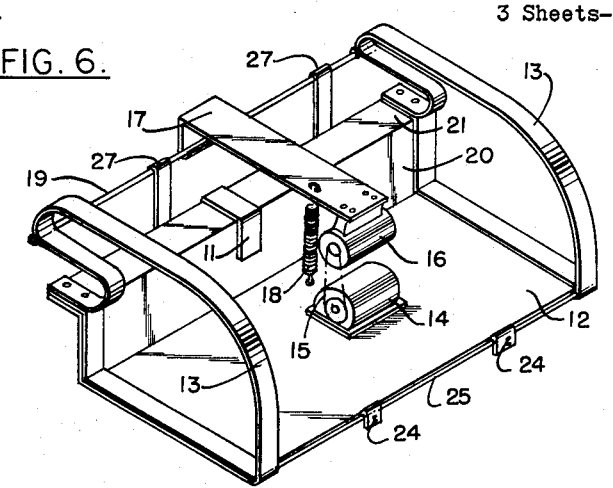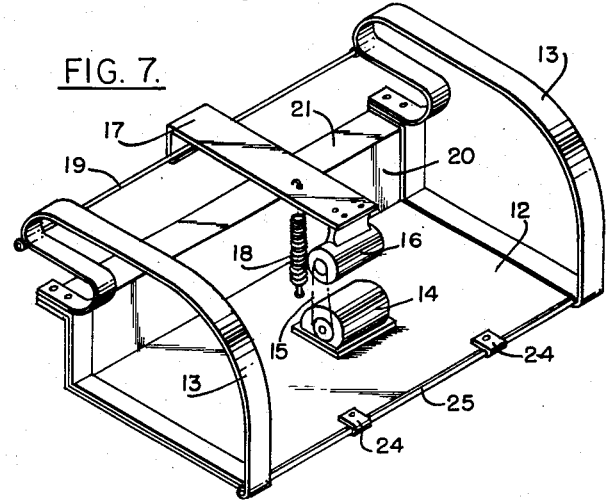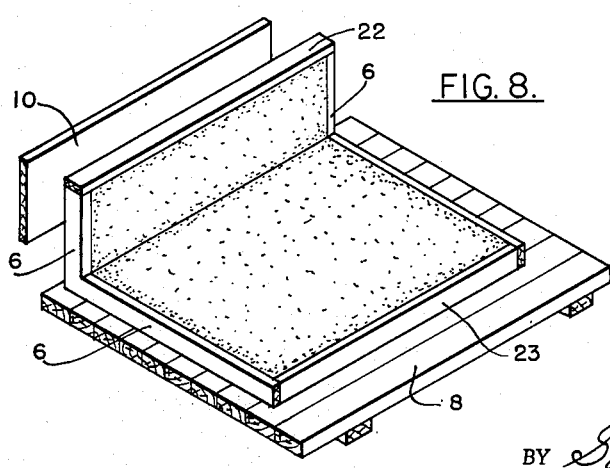

May 25, 1954
J. E. ERIKSSON
2,679,083
APPARATUS FOR MOLDING CEMENT STAIRSTEPS
Filed July 10, 1951
3 Sheets-Sheet 3
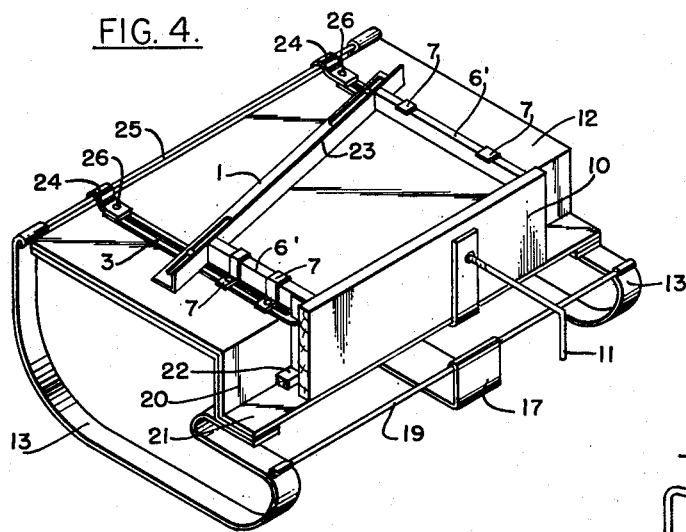
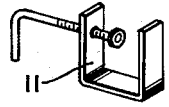
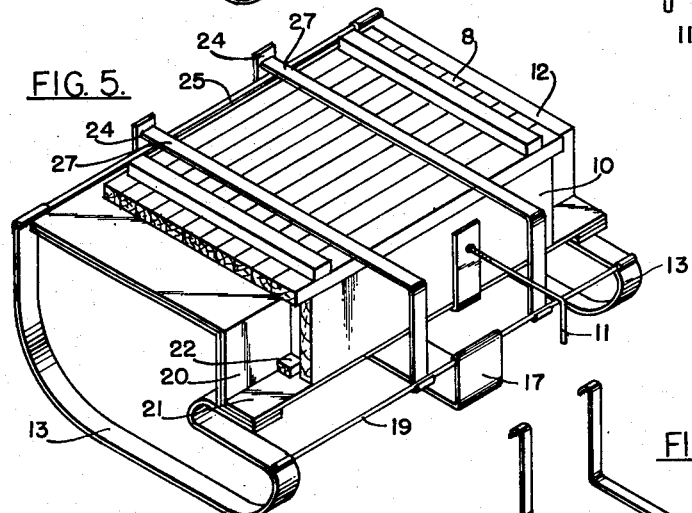
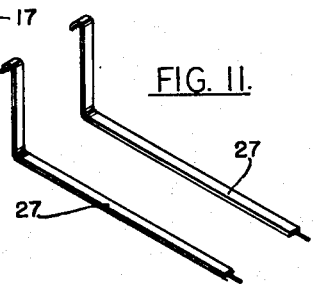
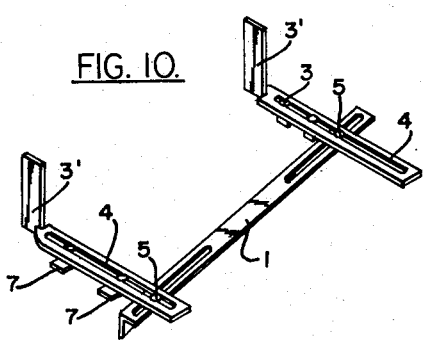
INVENTOR
JOHN E. ERIKSSON
BY Sommers & Young
ATTORNEYS Patented May 25, 1954

2,679,083

UNITED STATES PATENT OFFICE 2,679,083

APPARATUS FOR MOLDING CEMENT STAIRSTEPS

John Erik Eriksson, Jarbo, Sweden

Application July 10, 1951, Serial No. 235,965

1 Claim. (Cl. 25—41)

The present invention relates to a mould for the production of cement stair steps, especially of so-called angle block steps provided with a tread and a riser.

The mould according to the invention is principally distinguished by the feature that the mould comprises an open frame located in a plane for the forming of the vertical border surfaces of the tread and the riser. This frame is formed by three fillets constituting a front piece and two side pieces, said front piece preferably being an angle-iron. All fillets are provided with longitudinally extending slits, so that the side pieces are adapted to be clamped to the front piece in various positions of angular and rectilinear displacement by means of attaching bolts engaging said slits. The adjustment of the frame is intended to be effected by placing the frame on a stair step drawing made to a natural scale. Furthermore, an arm projects at right angles from the free end of each side piece, beside which fitting fillets are adapted to be clamped to the inner edges of the side pieces by means of clamps, said fitting fillets being arranged to form the inner surface of the mould for the flank surfaces of the tread and the riser.

In the description of the invention reference is made to the annexed drawings, the figures of which are perspective views.

Fig. 4 shows the frame with fitting fillets and lateral boards clamped into position, the mould being ready to receive moulding mass.

Fig. 5 shows the filled mould, the upper side of which is covered by a lid or cover.

Fig. 6 shows the lower side of the vibrating table with the mould secured underneath the same.

Fig. 7 shows the vibrating table with the mould removed.

Fig. 8 shows the moulded stair step as it appears when stripped from the mould.

Fig. 9 shows an adjustable clamp for clamping the side boards to the mould.

Fig. 10 shows the front and side pieces of the frame viewed from another side, and Fig. 11 shows two clamping straps to secure the lid or cover to the upper side of the mould.

Figure 1:
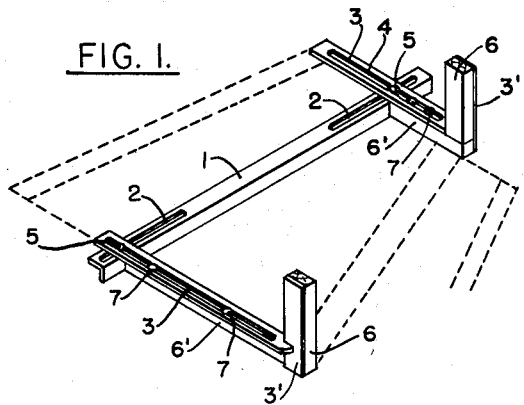
Fig. 1 shows an adjustable frame placed on a stair step drawing made to a natural scale.
Figure 2:
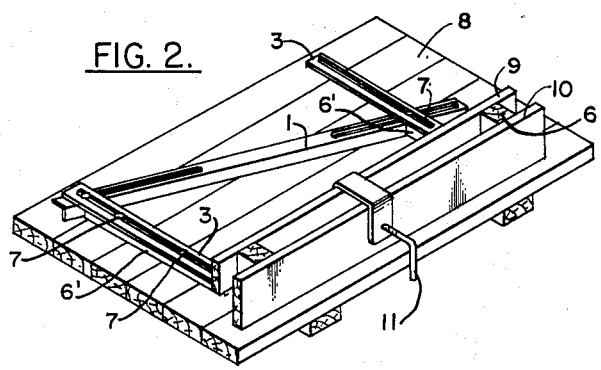
Fig. 2 shows a frame equipped with fitting fillets and with lateral boards.
Figure 3:
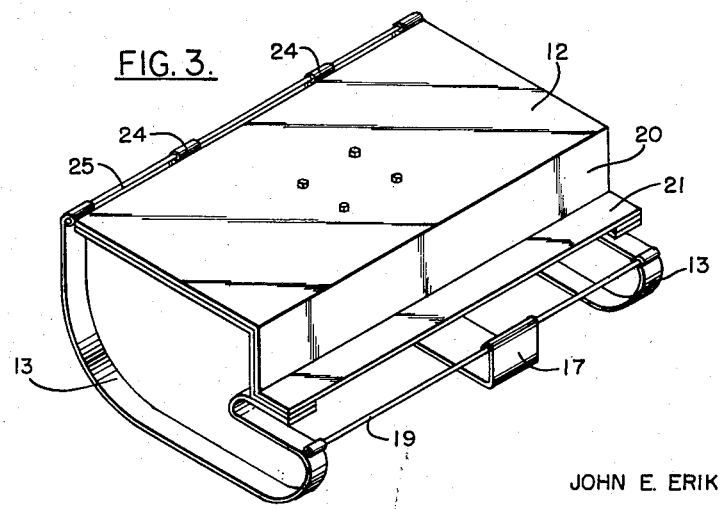
Fig. 3 shows a vibrating table for the mould.

The mould illustrated in the drawings comprises an open frame or mounting located in a plane, said frame being formed by three fillets or mouldings. They are constituted by a front piece 1 formed by an angle iron, the flange of which is situated in said plane being provided at the end portions thereof with longitudinally extending slits 2, and by side pieces 3 preferably made from flat bar iron. Each of these side pieces has longitudinally extending slits 4, and arranged at the one extreme end thereof is an arm 3' extending at right angles therefrom. The side pieces 3 are adapted to be clamped fast to the front piece 1, by means of attaching bolts 5 engaging said slits, in various positions of angular and rectilinear arrangement in the plane of the frame. The adjustment of the frame is effected by placing the same on a stair step drawing made to a natural scale and indicated in Fig. 1 by means of dash lines. After the adjustment, fitting fillets 6', 6 are placed on the inner borders of the side pieces and the arms respectively, said fitting fillets being clamped fast by means of clamps 7 (Fig. 4).

The frame thus made up, which is intended to form inner moulding surfaces for the front border and the lateral borders of the angular block step, may be used in two ways in the moulding of the stair step. The first and simplest way consists in placing the frame on a horizontal board 8 or on a floor, whereupon the arms 3' are clamped fast between rear and front side boards 9 and 10, respectively, by means of an adjustable clamp 11, the side board 10 then defining the outside height of the risers. Side board 9 rests with its lower edge upon the upper faces of side pieces 3, and is therefore spaced from board 8 by an amount equal to the combined thickness of side pieces 3 and fillets 6' which lie beneath side pieces 3, this combined thickness determining the thickness of the tread of the stair step. The frame and the space between the side boards are filled with cement moulding mass, the upper surfaces of which mass are provided, if desired, with a thin layer of an artificial stone mass. The upwardly facing surface of the cement moulding mass in the frame, which is to form the wearing surface of the tread, is accurately planed and ground with steel, if deisred. The second, more comprehensive way of using the mould according to the invention to mould an angular block step consists in that the frame is placed, with the arms 3' thereof directed downwardly, on a horizontal vibrating table, the top 12 of which is carried by resilient steel band straps or runners 13 secured underneath the short sides of said table top. Secured to the middle portion of the lower side of the table top is a vibrator 14, which is driven by means of a wedge-shaped belt 15 from an electric motor 16. The latter is carried by a horizontal, transversely arranged leaf spring 17, the middle portion of which is connected with the table top 12 by means of a helical spring 18, while the outer end of the leaf spring is offset and secured to a longitudinally extending rod 19, the ends of which are attached to U-shaped loops on the runners 13 (Figs. 6 and 7). One longitudinal side of the table top 12 is provided with a downwardly directed flange 20, the lower edge of which is provided with an outwardly directed horizontal fillet 21. The downwardly directed arms 3' of the frame bear against the vertical flange 20, and arranged underneath the ends of the arms 3' is a fitting fillet 22 filling the distance between the horizontal fillet 21 and the ends of the arms 3'. This fitting fillet 22 thus determines the height of the moulded riser. The previously mentioned side board 10 is clamped fast against the vertical outer edges of the arms 3', the lower edge of said side board bearing on the horizontal fillet 21, while the inwardly directed lower edge of said side board is at the same time pressed against the fitting fillet 22. The side board 10 is clamped fast by means of the previously mentioned adjustable clamp 11. It will be found suitable also to arrange a relatively thin fitting fillet 23 on the inside of the front piece 1 in order accurately to form the front border of the tread. The mould is secured onto the vibrating table 12 by means of clamps 24 gripping about and displaceable on a rod 25 secured along the longitudinal side of the table top. The clamps 24 are screwed onto the free ends of the side pieces 3 by means of attaching screws 26. After that, a thin layer of a mass of artificial stone is deposited in the mould, said layer being intended to form the visible surfaces of the stair step, whereupon ordinary cement moulding mass is filled in, after which the vibrating operation is carried out. After that the upwardly facing surface of the cement moulding mass is levelled along the fillets 6 and 23, the previously mentioned plate 8 being applied and secured to said fillets, said plate being secured by means of two transversely extending clamping straps 27 provided with hooks at one end thereof, said hooks being hooked onto the rod 19, after the opposite ends of them have been introduced into the clamps 24 disconnected from the side pieces 3. After that, the mould and the vibrating table are turned by half a revolution, so that the moulded stair step will lie on the cover 8 and can now be stripped by removal of the clamping straps 27 and the adjustable clamp 11, whereupon the vibrating table 12, the side board 10 and the front and side pieces 1, 3 are lifted away. The fillets 6, 22 and 23 may then be carefully removed, whereupon the mould may again be adjusted on the drawing for the moulding of the next stair step, the mould being again placed upon the inverted vibrating table for another moulding procedure, and so forth.

The mould and the vibrating table above described facilitate a manufacturing method for the production of stair steps, said method calling for one man only and for a comparatively small floor space without any special work benches. The adjustment of the mould according to the drawing made to natural size saves a considerable amount of time and avoids incorrect dimensions.

Obviously, the mould and the vibrating table according to the invention may be varied in many ways, without the basic principle of the invention being departed from.

Having now described my invention, what I claim as new and desire to secure by Letters Patent is:

An apparatus for moulding concrete stair steps of adjustable configuration comprising in combination a tiltable vibrating table having steplike top structure resting on resilient rockers and having a vibrator attached to its lower side, said top structure comprising an upper and a lower flat horizontal surface and a vertical surface connecting them, a mould frame comprising side pieces of adjustable length, each having a projection adapted to rest against said vertical surface of said vibrating table top to provide a side member for a vertical moulding pocket for the riser, and a cross member of adjustable length for forming the block edge of the tread, a mould wall for covering the front side of said moulding pocket for the riser, means for detachably retaining said mould frame and said mould wall on said vibrating table top, a lid for covering the moulding cavity within said moulding frame and said moulding wall after having poured concrete thereinto, means for detachably retaining said lid when tilting said table and reversing the same, means on said lid permitting removal of said last-mentioned retaining means after tilting of the table with the mould and means for causing said vibrator to generate setting vibrations in the concrete included in said mould on said table.

References Cited in the file of this patent

UNITED STATES PATENTS

| Number | Name | Date |
|---|---|---|
| 1,574,985 | McWain | Mar. 2, 1926 |
| 2,558,615 | Johnson | June 26, 1951 |

FOREIGN PATENTS

| Number | Country | Date |
|---|---|---|
| 414,162 | France | June 12, 1909 |